United States Patent
Cannizzaro

(10) Patent No.: US 12,476,924 B2
(45) Date of Patent: Nov. 18, 2025

(54) SYSTEMS AND METHODS FOR RANKING ACCESS CONFIGURATIONS

(71) Applicant: Capital One Services, LLC, McLean, VA (US)

(72) Inventor: Dominic Joseph Cannizzaro, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/462,042

(22) Filed: Sep. 6, 2023

(65) Prior Publication Data

US 2025/0080476 A1    Mar. 6, 2025

(51) Int. Cl.
*H04L 47/80* (2022.01)
*H04L 47/70* (2022.01)

(52) U.S. Cl.
CPC .......... *H04L 47/808* (2013.01); *H04L 47/822* (2013.01)

(58) Field of Classification Search
CPC ........................... H04L 47/808; H04L 47/822
USPC ....................................................... 709/229
See application file for complete search history.

(56) References Cited

U.S. PATENT DOCUMENTS

| | | | |
|---|---|---|---|
| 2012/0023554 A1* | 1/2012 | Murgia | H04L 63/20 726/4 |
| 2014/0040255 A1* | 2/2014 | Jones | G06F 21/6218 707/731 |
| 2015/0178392 A1* | 6/2015 | Jockisch | G06F 16/9535 707/706 |
| 2018/0039791 A1* | 2/2018 | Beye | G06Q 50/26 |
| 2019/0190844 A1* | 6/2019 | Resch | H04L 47/70 |
| 2020/0120135 A1* | 4/2020 | Hu | G06F 17/18 |
| 2023/0035335 A1* | 2/2023 | Badawy | G06F 21/604 |

* cited by examiner

*Primary Examiner* — Liang Che A Wang
*Assistant Examiner* — Ayele F Woldemariam
(74) *Attorney, Agent, or Firm* — Foley & Lardner LLP

(57) ABSTRACT

Systems and methods for ranking access configurations for requested resources. In some aspects, a system receives a resource access request from a user. The system obtains a resource access history for the user. The system generates access configurations available to the user. The system generates a plurality of probabilities using a machine learning model. The system, based on comparing probabilities with a threshold probability, determines a subset of access configurations. The system generates an access benefit metric for each access configuration. The system generates a representation of access configurations according to access benefit metrics.

19 Claims, 7 Drawing Sheets

100

| Resource Access Request 102 | |
|---|---|
| User Identifier 104 | |
| yianderson | |
| Requested Resource Parameters 106 | |
| Resource Specification 108 | Specification Value 110 |
| Requested Random Access Memory | 350 GB at 1200 GHz |
| Requested Processing Clock Speed | 2.0 GHz |
| Requested Number of Nodes | 12 |

| Resource Access History 122 |||
|---|---|---|
| User Identifier 124 |||
| yianderson |||
| Action 126 | Resource ID of Associated Resource 128 | Timestamp 130 |
| Access request for resource: 39258 | 39258 | 2018-03-10T08:20-05:00 |
| Read request for file: README.txt | 39258 | 2018-04-05T11:19-05:00 |
| Write request for file: README.txt | 39258 | 2018-04-05T11:35-05:00 |
| File transfer request to user ID veroberts | 93291 | 2018-04-06T18:07-05:00 |

| Access Configuration Identifier 142 ||
|---|---|
| Access Configuration 1 ||
| User-Related Access Configuration Thresholds 144 ||
| Threshold 146 | Threshold Value 148 |
| Maximum Risk Threshold | 25% |
| Minimum User Account Age | 5 years |
| Minimum User Productivity | 321900 petaflops per month |
| Resource-Related Access Configuration Thresholds 150 ||
| Maximum Random Access Memory | 500 GB at 1445 GHz |
| Maximum Processing Clock Speed | 2.3 GHz |
| Maximum Number of Accessible Nodes | 12 |
| Access Configuration Parameter Set 152 ||
| Parameter 154 | Parameter Value 156 |
| Estimated Computational Cost per Month per User | 15,000 GB-Hours of RAM |
| Estimated Computational Benefit per Month per User | 32492 petaflops per month |

Available Access Configurations 162

| Access Configuration 164 | Access Probability 166 | Access Benefit Metric 168 |
|---|---|---|
| Access Configuration 1 | 45% | 120 units |
| Access Configuration 2 | 30% | 212 units |
| Access Configuration 3 | 3% | N/A |
| Access Configuration 4 | 25% | 15 units |
| Access Configuration 5 | 0.4% | N/A |
| Access Configuration 6 | 0.6% | N/A |

| Threshold Probability 170 |
|---|
| 20% |

FIG. 1D

SYSTEMS AND METHODS FOR RANKING ACCESS CONFIGURATIONS

SUMMARY

The security of systems, such as computer networks, greatly benefits from strong user authentication and access protocols. A computer system, such as a data storage system or a high-performance computing (HPC) system, may possess an interface that enables users to request access to digital resources, while protecting the benefiting system and providing for its safety and efficiency. By doing so, a system may protect itself from abuse of resources or other security breaches, such as Trojan horse-type vulnerabilities, while providing resources to users. Particularly sensitive system resources, such as system administrator information, directories, computer processor allotments, or data, may be especially vulnerable to not only malicious attacks but also harm due to incompetence or inexperience of other users in the system. At the same time, users may benefit the system by utilizing its resources to develop and advance novel technologies. As such, a successful HPC or data storage system may engage users and encourage their utilization of system resources, while simultaneously providing for the safety and efficiency of the system.

Methods and systems are described herein for novel uses and/or improvements to managing access to digital resources. As one example, methods and systems are described herein for prioritizing and displaying configurations for accessing resources, such as data center resources, based on a user's likelihood to engage with a given access configuration. For example, in cases of high confidence in a user selecting a particular subset of options for resource access, the system may further prioritize or rank access configurations for display based on the likely benefit to the system associated with each access configuration.

Existing systems can provide options for determining user access to electronic resources based on resources requested by a given user. For example, existing systems may display available options to a user that enable the user to access the given resource. As an illustrative example, a conventional system may display options for a user requesting computational resources (e.g., a processing power or random access memory (RAM) allotment on an HPC system). Such options may include systems or computers that satisfy the requirements specified by the user. However, such conventional systems do not account for how desirable or convenient a particular option is for the user, even if all options are available for resource access. For example, conventional systems may not account for the likelihood that a user may select a given access option, thereby displaying undesirable or unengaging configurations for access to the user's requested resource. Furthermore, conventional systems do not account for the benefit and/or costs associated with providing a given resource access option to a user. As such, a user may select an access configuration that may not provide significant benefit to the system itself. For example, a user may select an option for access to a resource that may utilize more resources than may be required, thereby wasting computational power that could be utilized by other users for improved system efficiency. Thus, conventional systems lack a handling of both the potential user engagement and the system benefit associated with given access configurations.

To overcome these technical deficiencies in systems for managing access to digital resources for this practical benefit, methods and systems disclosed herein leverage a user's resource access history to generate probabilities that a given user may access a requested resource with a given access configuration. The system may select a subset of configurations that are likely to lead to user engagement by comparing the probabilities with a threshold. Moreover, the system may calculate access benefit metrics associated with each of these access configurations and display the subset according to a ranking of these calculated access benefit metrics. As such, the system provides the practical benefit of improving user engagement in, for example, an HPC system by providing access configurations that are more likely to result in system usage by the user. Furthermore, the system enables access configurations to be prioritized or ranked on a user display based on the system benefit expected to be gained by use of the resources by the user, thereby benefiting the system in addition to the user.

In some aspects, the system may receive a resource access request from a user. For example, the system may receive, from a first user via a user terminal, a resource access request that includes a first user identifier and a resource identifier for a requested resource. As an illustrative example, the system may receive a request for HPC resources with an identifier of the requested resources. For example, a user may submit a request for a particular set of processors that are requested, along with requirements for RAM usage. The system may collect such information to determine, for example, whether the requested resources are available to the user, as well as which options may be available to the user for accessing the requested resources if many such options exist. Thus, by receiving user information relating to resources requested, the system captures information that enables the personalization of any information or resources provided in response to the user's request.

In some aspects, the system may obtain a resource access history for the user based on the user identifier. For example, based on the user identifier, the system may obtain a resource access history for the user. The resource access history comprises a plurality of resource access requests from the user. As an illustrative example, the system may determine a user identifier associated with the user from the resource access request, such as a name, a username, or an identification number for the user. Based on this user identifier, the system may retrieve a resource access history that includes information relating to previous requests that the user may have submitted. Additionally or additionally, the resource access history may include, information about access configurations (e.g., access options) that are provided to the user in the past relating to the user's access of resources on the system, such as other processors that the user accessed, as well as any details regarding how those processors were accessed. By retrieving such information, the system may determine resources and corresponding access configurations that are associated with the user, thereby providing information relating to the degree of engagement of the user with the system based on the resources accessed by the user, as well as access configurations for this access. By incorporating this information, the system may make improved decisions with regard to provision of further resources to the user.

In some aspects, the system may generate a plurality of access configurations that are available to the user based on the resource identifier requested by the user. For example, based on the resource identifier for the requested resource, the system may generate a plurality of access configurations available to the user for obtaining access to the requested resource. As an illustrative example, the system may generate a list of physical resources, as well as a means for accessing such resources (e.g., a list of processors that may be available for remote access to the user). Such resources may include processors that are consistent with the user's request, including parameters such as the requested clock speed or requested amount of RAM. By generating a list of access configurations that may enable the user to access requested resources, the system determines possible ways to satisfy the user's request, where such options may engage or be desirable to the user to varying extents; furthermore, each access configuration may carry a different expected benefit for the system. As such, each of these access configurations may have varying consequences for both the user and the system.

In some aspects, the system may generate a plurality of probabilities relating to user engagement with the access configurations using a machine learning model. For example, the system may process the resource access history and the plurality of access configurations using a machine learning model to generate a plurality of probabilities, where each probability of the plurality of probabilities indicates a likelihood of the user accessing the requested resource using a corresponding access configuration of the plurality of access configurations. For example, based on the access configurations that are available for provision of the requested resource, as well as the user's resource access history (e.g., a list of other processors that the user may have used in the past), the system may determine the likelihood that the user may select a given access configuration (e.g., a particular processor configuration associated with the HPC system). For example, the system may utilize a probabilistic machine learning model to generate such probabilities based on the user's past behavior. By doing so, the system may learn how access configurations may affect a user's engagement with the system, thereby affecting the system's efficiency and desirability.

In some aspects, the system may compare each probability with a threshold probability to determine a subset of access configurations that are likely to appeal to the user. For example, based on comparing each probability of the plurality of probabilities with a threshold probability, the system may determine a subset of access configurations having a corresponding probability that is greater than the threshold probability. As an illustrative example, the system may select a subset of processors that are most likely to appeal to the user (e.g., processors that are most consistent with the user's previous work on the HPC system and, therefore, that the user is most likely to select). The system may compare each probability calculated above with a threshold probability that is indicative of a user's likely engagement with the system. By doing so, the system may ensure that only options relating to, for example, computer or processor configurations that are likely desirable to the user may be presented, thereby improving the chance of the user's use of the system for access to required resources. Thus, the system enables improved engagement with and utilization of the HPC system based on leveraging the user's previous use of the system.

In some aspects, the system may calculate an access benefit metric for each access configuration of the subset of access configurations determined to be likely to lead to user utilization of the system. For example, based on a plurality of parameters corresponding to each access configuration of the subset of access configurations, the system may generate an access benefit metric for each access configuration of the subset of access configurations. Each access benefit metric may indicate a measure of resource savings for the system when the user accesses the requested resource through an associated access configuration. For example, the system may calculate or quantify the likely throughput (and, therefore, utilization) of the system if the user executes tasks on the HPC system using a given access configuration. The system may balance the likely system utilization metric with the cost or resources used up by the user for a given access configuration. As such, the system may determine the consequences, such as the system benefit, associated with the user's selection of a given access configuration.

In some aspects, the system may generate a display of a ranking of access configurations that are in order of decreasing access benefit metric. For example, the system may generate, for display on a user interface associated with the user terminal, a ranked representation of the subset of access configurations displayed in order of decreasing access benefit metric for the associated access configuration. As an illustrative example, the system may select access configurations most likely to be chosen by the user; furthermore, the system may display these access configurations in a ranked order that reflects the system benefit associated with each of these access configurations. For example, the system may display a list of processors associated with the HPC system that are most likely to be chosen by the user for access to the requested processor. The system may display the list based on a measure of the system risk or computational cost associated with providing the processor to the user for a requested amount of time. By doing so, the system may encourage the user to choose more efficient processors or computational configurations over less efficient configurations, while still encouraging the user to use the HPC system itself. Thus, the system may balance user engagement with the HPC system with maintaining the efficiency and functioning of the system.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 1A shows an illustrative data structure for a resource access request for requesting HPC resources, in accordance with one or more embodiments.

FIG. 1B shows an illustrative data structure for a resource access history corresponding to a user, in accordance with one or more embodiments.

FIG. 1C shows an illustrative data structure for access configuration thresholds and parameters, in accordance with one or more embodiments.

FIG. 1D shows an illustrative diagram for access probabilities and access benefit metrics corresponding to access configurations, in accordance with one or more embodiments.

DETAILED DESCRIPTION

Figure 2:
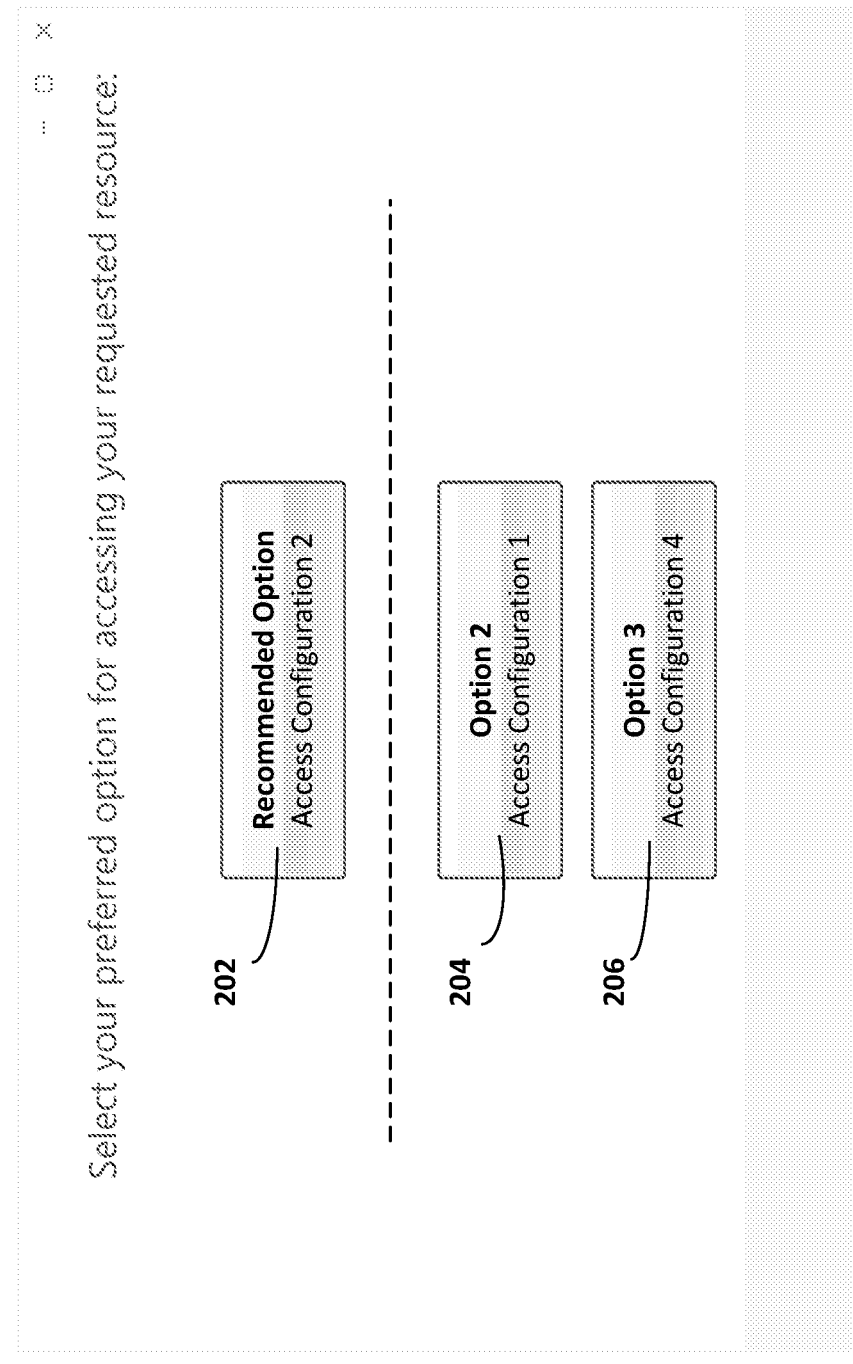
FIG. 2 shows an illustrative user interface for user selection of access configurations for accessing requested resources, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1A shows illustrative data structure 100 for resource access request 102 for requesting HPC resources, in accordance with one or more embodiments. For example, resource access request 102 may be associated with a user having user identifier 104. In some embodiments, resource access request 102 may include requested resource parameters 106, such as resource specifications 108 and specification values 110. For example, the system may receive a resource access request that requests access to digital resources, such as computational resources. Thus, users may specify a requested computer configuration through the resource access request to query the system for a corresponding way to access the requested resources.

In some embodiments, the system may include resource access request 102. A resource access request may include a message, communication, data structure, or indication of resources requested by a user. For example, a resource access request may include a request for computational resources associated with an HPC system. As an illustrative example, a user may request resources associated with a set of computer processors with sufficient RAM and processing clock speed. The system may receive resource parameters characterizing the requested resources. For example, the requested resources may include a specification of characteristics of the digital resources, as shown by resource specifications 108. Characteristics of the requested digital resources may include specification values 110 (e.g., parameters associated with resources), which may characterize the nature of the resources. As an illustrative example, the system may specify a resource identifier associated with a specific resource, or any other description of the resource. In some embodiments, a resource access request may specify access to a line of credit or other financial resources. In some embodiments, a resource access request may include a request for execution of a digital purchase, such as a request for a purchase of an item from a merchant. By receiving resource access requests, the system enables users to request, in a descriptive manner, resources that may be provided by the system, such that the system may evaluate such requests and provide corresponding options for user access.

In some embodiments, a resource access request from a user may include or be associated with user identifiers, such as user identifier 104 as shown in FIG. 1A. A user identifier may include any identifier of a user, such as a birthdate, an identification moniker, a username, or an identification number (e.g., an individual taxpayer identification number or a social security number). For example, when submitting a resource access request, a user may include a user identifier in order to identify themselves. By including and/or receiving user identifiers, the system may track users based on their requested resources, their experience or risk levels, and their access to different system components. For example, a user identifier may enable the system to look up and/or determine a measure of risk, based on actions associated with the user identifier either in the past or in the present and either within or external to the system itself. Thus, the system may better evaluate users and, subsequently, control or determine options for user access to resources.

The resource access request may include a request for the system to allocate resources. In some embodiments, resources may include any virtual or physical object, asset, or material. For example, a resource may include a digital asset, such as a file, a directory within a file system, or data/information. In some embodiments, a resource may include access to a number of HPC processors, nodes, or cores (e.g., for a particular amount of time). Additionally and/or alternatively, a resource may include digital or physical resources, such as funds, items, or credit. By receiving requests for resources, the system may determine options that are commensurate with both a user's request and the system resources in order to provide the user with access configurations.

In some embodiments, the resource access request may include resource identifiers, such as resource IDs of requested resources. For example, a resource ID may include an alphanumeric identifier or code describing a resource, such as a code describing a particular processor in an HPC system. In some embodiments, a resource ID may include a directory name, a file name, or a database identifier. In some embodiments, a resource ID may include an indication of an amount of funds, currencies, or credit that a member of a given access control list may be given access to. In some embodiments, a resource ID may include a specification of an identifier of an item or service for purchase, such as a barcode number or a product (e.g., SKU) number. By specifying resource identifiers and associating them with resource access requests, the system may determine whether the requested resources are accessible to the user and may generate options for subsequent user access.

In some embodiments, the resource access request may characterize requested resources using resource parameters. In some embodiments, resource parameters may include a characterization of requested resources. In some embodiments, resource parameters may specify one or more minimum or maximum attributes associated with a resource. For example, in the case of a requested computational resource for a prospective user of an HPC system, resource parameters may include resource specifications 108, detailing a minimum number of nodes requested, a minimum processing clock speed, and/or a minimum amount of RAM. The values of these attributes or parameters may include specification values 110. Alternatively or additionally, resource parameters may include a specification of a line of credit desired and a payment schedule length. For example, a user may specify a resource parameter that indicates a size of a loan or line of credit, as well as a number of months for repayment. By including resource parameters within the resource access request, the user may specify details relating to requested resources, thereby enabling the system to provide options for accessing the appropriate resources correspondingly.

FIG. 1B shows illustrative data structure 120 for a resource access history corresponding to a user, in accordance with one or more embodiments. For example, resource access history 122 may be associated with user identifier 124. In some embodiments, resource access histories corresponding to multiple users may be stored in a user database or a resource access history database. Resource access history 122 may include information corresponding to resources or actions taken by the user with relation to the system. For example, resource access history 122 may include a list of actions accessed by a user associated with user identifier 124 (e.g., actions 126) and/or timestamps of when the action was performed and/or when the resource was accessed (e.g., timestamps 130). In some embodiments, timestamps 130 may include indications of ranges of times during which a resource was accessed, for example. As an illustrative example, actions recorded within resource access history 122 may include, as in the case of an HPC system, events or actions with respect to file transfers or use of processors within the system. Resource access history 122 may include information relating to the resource identifiers 128 of resources accessed by the user associated with user identifier 124, including file system modifications or actions taken by the user on these specified resources. By receiving a history of a user's access of previous resources, the system may evaluate a user's most likely behavior with respect to resource access. For example, the system may determine patterns or probabilities of a user accessing a similar resource in the future based on the user's past activity. By doing so, the system may generate suggested options for accessing requested resources in a manner that may lead to improved user engagement and use of such resources based on the user's prior utilization of the system's resources.

In some embodiments, resource access history 122 may include resource access events, such as a list of actions 126. In some embodiments, a resource access event may include any event or occurrence of a user accessing a resource, such as a processor associated with an HPC system. For example, resource access events may include requests for access (e.g., through a secure shell terminal) to a processor, and any modifications to files (e.g., README files or transfers of files to other directories). For example, resource access events may include actions 126. The system may include corresponding resource identifiers 128, as well as timestamps 130. Additionally or alternatively, resource access events may include events associated with transactions, purchases, or lending/borrowing as related to lines of credit. As an illustrative example, a resource access event may include a transaction to purchase a particular product or service, or may include access of a particular payment method. For example, a resource access request may include an indication of prior use of a buy-now-pay-later plan for a product from a particular merchant. In some embodiments, a resource access event may include a failure to complete an action by a particular deadline, such as a failure to update a README file prior to deployment of a feature, or a failure to pay back a particular amount of debt associated with a credit account. For example, timestamps of the corresponding transactions and payments may be included within the resource access history as resource access event parameters. By recording such information, the system gains information relating to the behavior of users, thereby enabling the system to evaluate and suggest configurations for accessing requested resources that may be consistent with the request, while still being desirable or consistent with the user's behavior or actions.

In some embodiments, the system may calculate a measure of risk associated with the user based on the resource access history. The measure of risk may include a qualitative and/or quantitative measure of a user's expected behavior. For example, a measure of risk may include an indication of a probability that a user will damage the system within a set time period, or may include an indication of a value of resources expected to be wasted or lost. In some embodiments, a measure of risk may include a ranking of how experienced a user is within the system, where an inexperienced user who has used the system for a small amount of time may have a lower ranking (and, thus, a larger value of rank and a subsequent measure of risk) than an experienced user who has used the system for a long time. In some embodiments, a measure of risk may be calculated based on received information regarding the user, where the received information may include indications of previous experience in other systems or situations. For example, a measure of risk may be independently calculated based on a user's reputation or rating by an external agency (e.g., based on a researcher's h-index, a credit rating, or another public metric). In some embodiments, the system may calculate an updated measure of risk based on a user's usage of the present system, such as through information about a user's actions as directed toward system resources. Such actions may be listed within resource access history 122 or another database of user behavior, actions, or resource use. The updated measure of risk may be calculated using a machine learning model, where the machine learning model may be trained to determine a measure of risk based on the user's actions or behavior. By enabling a calculation of an updated measure of risk, the system may determine a user's propensity to select or engage with a particular option for accessing resources. In some embodiments, the measure of risk may be used to determine resources that the user may be qualified to access. Thus, even for users about whom prior information regarding behavior is not immediately available, the system may dynamically evaluate users and generate a measure of risk accordingly. Therefore, in some embodiments, the system may provide a manner with which to determine access of system resources for the user.

FIG. 1C shows illustrative data structure 140 for access configuration thresholds and parameters, in accordance with one or more embodiments. For example, data structure 140 includes information relating to an access configuration associated with access configuration identifier 142 (e.g., "Access Configuration 1" as shown in FIG. 1C). In some embodiments, the corresponding access configuration may be associated with threshold values, such as user-related access configuration thresholds 144 and/or resource-related access configuration thresholds 150. By retrieving, generating, or receiving information relating to access configurations, the system may consider possibilities for providing users with access to requested resources based on parameters and/or attributes associated with both the user's request and the access configurations.

For example, the system may retrieve information relating to access configurations from an access configuration database. An access configuration may include thresholds associated with users who are allowed to access given resources associated with the access configuration. An access configuration may enable a user to access one or more resources. For example, an access configuration may specify one or more resource identifiers corresponding to resources that may be accessible to the user. In some embodiments, an access configuration may include a time limit for access to such resources, or a set of rules for continued access to the resources. As an illustrative example, an access configuration may specify a particular set of processors and processor identifiers that may be accessible to a user for a predetermined period of time as an option. In some cases, an access configuration may specify a product that the user may acquire (e.g., through a merchant) given a payment plan with a particular interest rate.

For example, an access configuration may include user-related access configuration thresholds 144. For example, access configuration thresholds may specify threshold values for attributes relating to the user, such as thresholds 146, as well as corresponding threshold values 148. As an illustrative example, "Access Configuration 1" depicted in FIG. 1C may only be accessible to users associated with a measure of risk less than a risk threshold (e.g., a maximum risk threshold) or a minimum user account age and/or productivity. As an illustrative example, the system may calculate the measure of risk for the user based on the user's resource access history. The system may compare the measure of risk with a risk threshold corresponding to each possible access configuration and determine whether the access configuration is appropriate for the user. For example, a user with little previous experience on HPC systems, or on very simple processors, may have a risk that is higher than the risk threshold for a very complex machine within the HPC system. As such, the system may protect against risky users by preventing valuable resources from being provided to risky users. Additionally or alternatively, access configuration thresholds may include resource-related access configuration thresholds 150. For example, an access configuration may include a set of thresholds that characterize requirements for satisfying a resource access request. The access configuration may only be accessible to users whose requested resources are consistent with the set of thresholds. As an illustrative example, the access configuration may specify that access may only be given to users requesting computational resources with less than a particular amount of RAM, less than a particular clock speed, and/or less than a particular number of nodes. For example, the system may compare resource parameters associated with the requested resource with the resource-related access configuration thresholds 150 to determine whether to provide access to the requested resource to the user. By specifying rules and a framework for accessing resources, access configurations enable the system to provide resources to users in a controlled manner while improving the safety and efficiency of the system.

In some embodiments, requested resources may include financial resources, such as lines of credit and/or purchased items or services. In such cases, an access configuration may specify user-related thresholds relating to whether the given access configuration (e.g., a payment plan) is appropriate for the user, such as given their payment history. For example, access configuration thresholds may include a user's required credit rating (e.g., a measure of risk), as well as a required previous on-time payment rate. In some embodiments, an access configuration threshold may include a condition for a particular account age (e.g., number of open credit accounts) and/or a required income. Additionally or alternatively, an access configuration threshold may include information relating to the user's requested resource (e.g., a requested item to be purchased from a merchant). For example, an access configuration threshold may include a maximum value for an item that is allowed to be purchased using the given access configuration, or a maximum value for the number of lines of credit/accounts being requested. As such, the system may manage risks associated with providing access to resources to users based on information relating to both the user and the requested resource.

In some embodiments, the system may determine access configuration parameters, such as within access configuration parameter set 152. An access configuration parameter may include a characterization of an access configuration, such as a characterization of access to the access configuration once access is granted to the user. Access configuration parameter set 152 may include parameters 154 and/or corresponding parameter values 156. For example, in the case of a user accessing an HPC system according to a given access configuration, the system may determine, predict, generate, or retrieve parameters or characteristics related to the user's use of the system, such as the estimated computational cost per month for the user (e.g., a value of hours of RAM expected to be used by the user). In some cases, the system may predict an estimated computational benefit per month for the user, such as a number of calculations or processes run by the user for the benefit of the system. For example, the system may determine the estimated computational benefit in petaflops per second. In some embodiments, the system may predict financial parameters associated with an access configuration. For example, in the case of a user accessing financial resources (e.g., a line of credit or a purchase from a merchant), the system may determine a parameter set that includes a financial risk associated with providing the resource with a given access configuration. Alternatively or additionally, the system may determine a financial benefit for providing the resource with a given access configuration to the user (e.g., in the form of an interest payment or a fee for a buy-now-pay-later plan). As such, the system may track the possible consequences of conferring access to resources through a given resource configuration, thereby enabling evaluation and prediction of system outcomes as a function of choice of access configuration.

FIG. 1D shows an illustrative diagram for access probabilities and access benefit metrics corresponding to access configurations, in accordance with one or more embodiments. For example, data structure 160 demonstrates available access configurations 162, which represent access configurations that may provide the user with one or more requested resources. For example, the system may determine that access configurations 164 are suitable for user access of a requested resource. In some embodiments, the system may determine access probabilities 166 for each access configuration, which may reflect the likelihood that a user may select a given access configuration. The system may compare access probabilities 166 with threshold probability 170 to determine access configurations to present to the user, for example. Furthermore, the system may generate access benefit metrics 168 for a subset of access configurations 164. By doing so, the system may evaluate both a likelihood of a user's engagement with the system and a user's effect or benefit on the system based on access to requested resources.

In some embodiments, the system may generate a plurality of probabilities, such as access probabilities 166. As disclosed herein, a probability may include a measure of likelihood, such as a likelihood that a user may access a requested resource using a given access configuration. For example, a probability may indicate the likelihood that a user may access a computational resource on an HPC cluster using a particular access configuration (e.g., set of processors with rules for use). In some embodiments, a probability may indicate a likelihood that a user may access financial resources, such as lines of credit within a buy-now-pay-later plan, using a given borrowing framework (e.g., with a given interest rate and/or payment plan). For example, the system may determine access probabilities based on a user's resource access history, which may indicate prior resources (e.g., prior products that were bought using a buy-now-paylater plan). The system may input information from the resource access history into a machine learning model, as well as details regarding each possible access configuration for accessing the requested resources. Based on these inputs, the machine learning model may output a corresponding probability that a user may access the given access configuration. By doing so, the system may evaluate the likelihood that a user may engage with the system by accessing the requested resource, thereby aiding the system in suggesting possible access configurations that may be desirable to the user.

In some embodiments, the system may compare generated access probabilities 166 with threshold probability 170. For example, the system may compare each access probability corresponding to each access configuration with the threshold probability to determine a subset of access configurations that are more likely to be selected by the user for accessing the requested resource. As an illustrative example, the system may determine that, based on a user's previous buy-now-pay-later purchases with an interest rate of lower than 2% per month, the user is most likely to select access configurations with a similar interest rate based on the generated access probabilities. Thus, the system may determine a subset of access configurations that are still likely to be selected by the user, thereby enabling the system to encourage use of the system and, thus, improve system utilization and efficiency.

Figure 3:
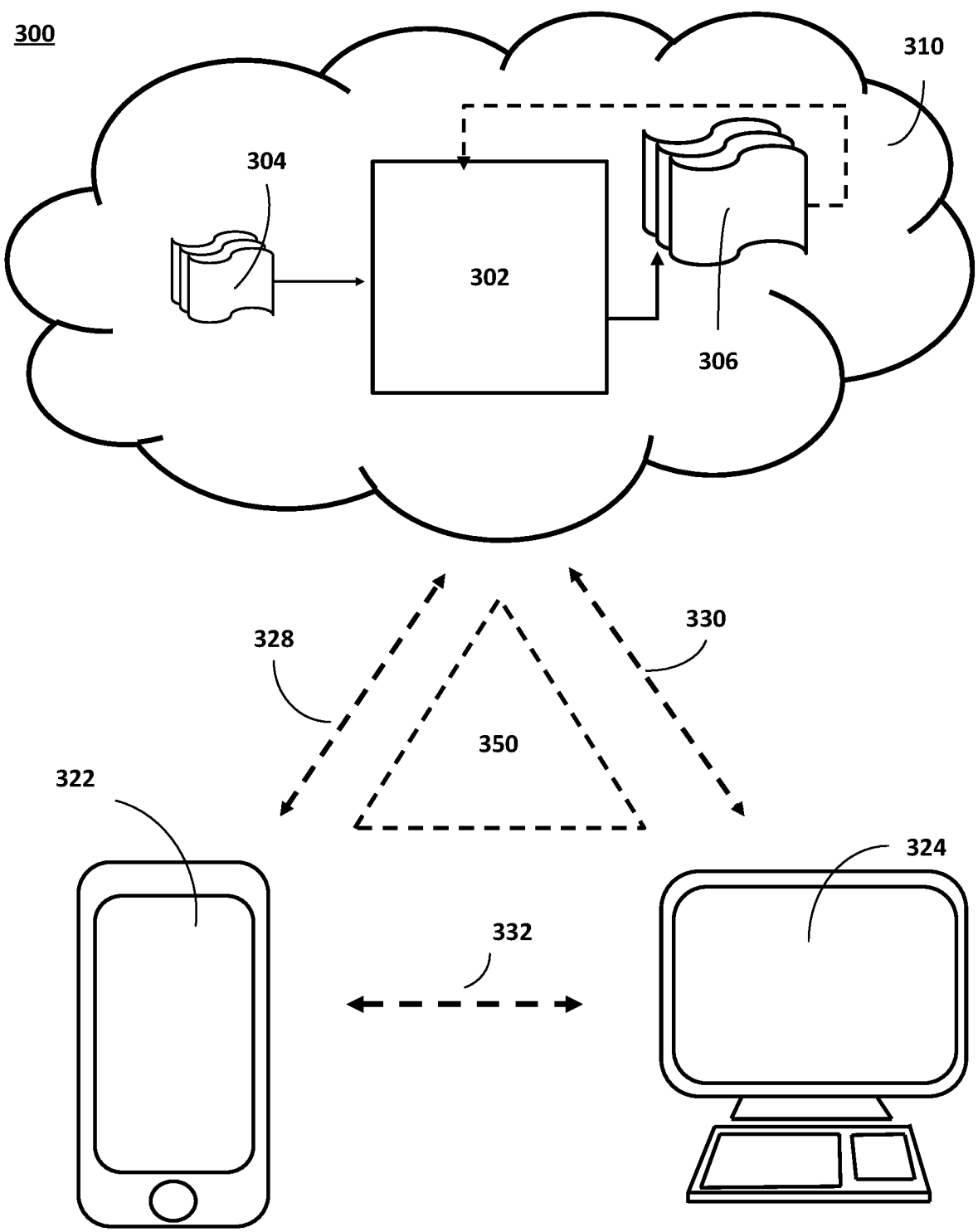
FIG. 3 shows illustrative components for a system used to manage access to digital resources, such as HPC resources, in accordance with one or more embodiments.

In some embodiments, the system may utilize machine learning models to evaluate how parameters relating to access configurations may affect use of the system. A machine learning model may include supervised and/or unsupervised learning, such as through artificial neural networks, in order to classify or predict outcomes relating to user access of resources. FIG. 3 includes further details relating to the operation and application of machine learning models. For example, the system may utilize a machine learning model to generate probabilities relating to whether a user is likely to access a requested resource using a given access configuration. In some embodiments, a machine learning model may generate information relating to system benefit due to access of a given requested resource using a given access configuration. For example, in some embodiments, a machine learning model (e.g., a second machine learning model) may accept, as input, parameters relating to an access configuration (and/or information relating to the prospective user of the corresponding respective resources) and output a metric indicating an expected benefit to the system based on the user's access. As such, machine learning models enable the system to improve evaluation of use of system resources in order to improve the system's efficiency, utilization, and/or security.

In some embodiments, the system may generate access benefit metrics corresponding to users accessing resources using given access configurations. For example, an access benefit metric may indicate a measure of resource savings (e.g., resource benefit) for the system when a user accesses requested resources through an associated access configuration. As an illustrative example, the system may determine access benefit metrics for access configurations that enable the user to access the requested resource. Alternatively, the system may determine access benefit metrics only for a subset of access configurations that a user is most likely to access (e.g., for access configurations with probabilities greater than threshold probability 170, as shown by the illustrative shaded cells within data structure 160). In some embodiments, an access benefit metric may be a quantitative value (e.g., with a quantitative unit). Alternatively or additionally, an access benefit metric may be categorical, such as with a "high," "medium," and/or "low" benefit rating. The access benefit metrics corresponding to a given access configuration may be determined using a machine learning model, and may be based on a parameter set associated with the given access configuration. By doing so, the system may evaluate which access configurations are likely to lead to improved system functioning, efficiency, or benefit. The system may selectively suggest access configurations that may lead to higher system benefits to the user (e.g., by generating a ranked order of access configurations based on the access benefit metrics 168), thereby improving the chance that a user may select a beneficial access configuration for accessing the requested resource.

For example, the system may generate access benefit metrics based on parameters associated with the access configuration (e.g., parameter set 152 of FIG. 1C). For example, parameters may include an expected risk metric. An expected risk metric may include information or a measure relating to whether accessing a given resource may lead to risk to the system. For example, an expected risk metric may include a computational cost associated with a user accessing a requested computational resource with a given access configuration (e.g., with a given computational configuration), such as a number of hours of use of RAM integrated over the amount of RAM used. Because use of RAM may be costly to the system (which may utilize RAM in other respects as well), such a metric may characterize a loss or risk associated with providing the resource to a given user. In some embodiments, an expected risk metric may include a measure of a likelihood that a user may not pay within a specified period of time or according to specified rules, such as within a buy-now-pay-later plan. For example, the system may update the estimated financial risk to the system given the user's previous behavior (e.g., a previous payment history), such as through a machine learning model. By determining possible risk to the system, the system may evaluate the effect of user access to a requested resource using a given access configuration, thereby mitigating the impact of unfavorable access configurations to the system.

Parameters associated with the access configuration (e.g., in a parameter set) may include determination or updating of an expected gain metric. For example, an expected gain metric may include information or a measure relating to whether accessing a given resource may lead to gain or gross benefit to the system. As an illustrative example, an expected gain metric may include a computational gain or benefit to the system due to the user accessing a given computational resource with a given access configuration (e.g., with a given computational configuration of processors and RAM). For example, the system may determine an estimated number of calculations (e.g., a value of expected floating point operations) that may be carried out to the benefit of the system. Because such floating point operations may reflect system utilization of resources and, therefore, efficiency, such a metric may characterize a gain associated with providing the resource to a given user. In some embodiments, an expected gain metric may include a measure of the benefit due to a user purchasing a product or a service, such as a price or interest rate that is to be paid to the system in exchange for a buy-now-pay-later plan. For example, the system may update the estimated financial gain metric to the system given the user's previous behavior (e.g., a previous payment history), such as through a machine learning model. By determining possible gain to the system, the system may evaluate the effect of user access to a requested resource using a given access configuration, thereby improving the impact of access to system resources, such as utilization or merchant margins.

An expected resource access outcome may include an indication or measure of system benefit, such as due to a user's previous access of resources. For example, a resource access outcome may include information relating to a user's actual computational cost (e.g., an amount of RAM taken up for a given period of time) or computational benefit (e.g., a number of floating point operations carried out) to the system. As an illustrative example, the system may receive information relating to whether users have previously paid according to a payment plan specified by a given access configuration for accessing requested resources. Alternatively, a resource access outcome may include information relating to whether any users have missed payments within a buy-now-pay-later plan and, therefore, whether the system has sustained any losses due to access of the given resource. By including information relating to system outcomes associated with access configurations, the system may train a machine learning model to generate predictions as to a likely access benefit metric associated with given access configurations, thereby enabling the system to more accurately evaluate the effect of providing a requested resource to a user using a given access configuration.

FIG. 2 shows illustrative user interface 200 for user selection of access configurations for accessing requested resources, in accordance with one or more embodiments. For example, the system may enable display of one or more mechanisms (e.g., buttons) for selecting an access configuration, where each selectable access configuration enables access to the requested resource. For example, the system may recommend Access Configuration 2 (e.g., through mechanism 202). However, the system may enable a user to select other options, such as Option 2 or Option 3 using mechanism 204 or mechanism 206, respectively. By enabling a user to select options, the system enables tailoring of a user's access to requested resources, which improves user engagement with the system and, as such, system utilization.

For example, the system may generate a representation of access configurations. For example, based on the access benefit metric, the system may order access configurations (e.g., a subset of access configurations with probabilities above a threshold probability) according to the estimated benefit to the system when a user accesses resources using the given access configuration. As an illustrative example, the system may generate a ranked order of access configurations where the access configuration with the highest expected merchant margin and/or the lowest amount of risk of loss is at the top of the list, and subsequent access configurations are listed in order of decreasing access benefit. In some embodiments, the system may receive a user response, such as through interactions with mechanisms corresponding to access configurations. For example, a user may select a button on a user interface indicating that the user would like to access the requested resource using a chosen access configuration. The system may, subsequently, provide access to the resource according to rules, parameters, or procedures associated with the chosen access configuration. By generating the ranked representation of access configurations (e.g., an ordered list of such access configurations) and enabling user selections based on this ranked representation, the system may prioritize access configurations or options that may benefit the system over access configurations that may be more likely to harm or less likely to benefit the system. As such, the system may encourage users to choose more beneficial or less harmful options for accessing requested resources based on such an evaluation of system benefit.

FIG. 3 shows illustrative components for a system used to manage access to digital resources, such as HPC resources, in accordance with one or more embodiments. For example, FIG. 3 may show illustrative components for evaluating HPC resources that may enable access to a user's requested computational resources and providing options for such access accordingly. As shown in FIG. 3, system 300 may include mobile device 322 and user terminal 324. While shown as a smartphone and a personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational responses, queries, and/or notifications).

Additionally, as mobile device 322 and user terminal 324 are shown as a touchscreen smartphone and a personal computer, respectively, these displays also act as user input interfaces. It should be noted that in some embodiments, the devices may have neither user input interfaces nor displays, and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include resource access requests, associated resource parameters, resource access histories, associated user identifiers, access configuration details, associated access configuration thresholds and/or parameters, subsets and lists of available access configurations, corresponding access probabilities, and corresponding access benefit metrics.

Cloud components 310 may access user activity databases for information relating to access histories, as well as access configuration databases, system configuration databases, and/or other information relating to system or user behavior.

Cloud components 310 may include one or more models 302, which may be machine learning models, artificial intelligence models, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a probability that a user may access a requested resource using a particular access configuration).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a benefit level, a gain level, or a risk level of a user accessing a requested resource using a given access configuration).

In some embodiments, the model (e.g., model 302) may automatically perform actions based on outputs 306. In some embodiments, the model (e.g., model 302) may not perform any actions. The output of the model (e.g., model 302) may be used to evaluate and/or suggest access configurations to users that may be engaging (e.g., improve system utilization) and/or may carry high benefit or low risk to the system.

System 300 also includes application programming interface (API) layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of the API layer 350 may provide integration between front-end and back-end layers. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDOS protection, and API layer 350 may use RESTful APIs as standard for external integration.

Figure 4:
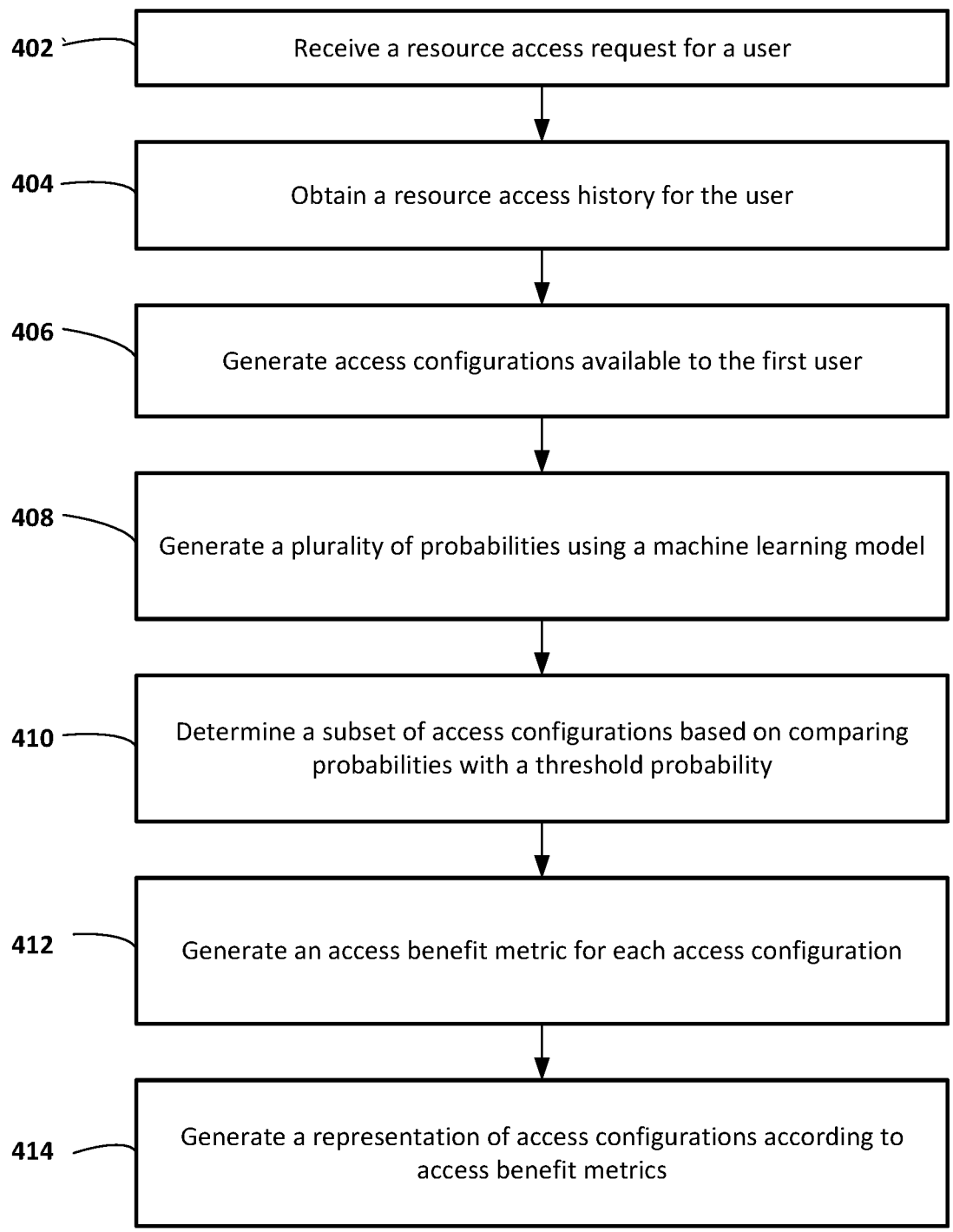
FIG. 4 shows a flowchart of the steps involved in evaluating and displaying configurations for user resource access, in accordance with one or more embodiments.

FIG. 4 shows a flowchart of the steps involved in evaluating and displaying configurations for user resource access, in accordance with one or more embodiments. For example, the system may use process 400 (e.g., as implemented on one or more system components described above) in order to generate and display access configurations for access to computational resources and/or financial resources based on expected user engagement and/or system benefit.

At step 402, process 400 (e.g., using one or more components described above) enables the system to receive a resource access request for a user. For example, the system may receive, from a first user via a user terminal, a resource access request comprising a first user identifier and a first requested resource. As an illustrative example, the system may receive a request from a user for computational resources and/or financial resources, such as a line of credit for purchasing a product from a merchant. The request may indicate an identifier corresponding to the user, such as a name, an identification number, or an account number. The request may indicate a requested resource, such as for a line of credit with a particular principal amount and requested interest rate or payment plan. For example, the request may indicate a purchase or another transaction at a merchant, where a customer requests a payment plan for payment in exchange for an item (as in a buy-now-pay-later plan). In some embodiments, the request may indicate a requested loan length and/or a requested purchase amount. By receiving requests for access to resources, the system may manage resources in a manner that improves system utilization while ensuring that resources are provided in an efficient, secure manner to users.

At step 404, process 400 (e.g., using one or more components described above) enables the system to obtain a resource access history for the user. For example, based on the first user identifier, the system may obtain a first resource access history for the first user, wherein the first resource access history indicates information comprising resources previously accessed by the first user. As an illustrative example, the system may use the user identifier provided by the user to obtain information relating to other resources the user may have previously requested and/or accessed, such as other products or services requested from merchants and any payment plans (e.g., buy-now-pay-later) that the user may have used. For example, the system may obtain a list of previous purchases or transactions of a customer at a merchant (additionally or alternatively, across multiple merchants), including other buy-now-pay-later loans or lines of credit that may have been used by the user or customer within a pre-determined period of time prior to the request. By retrieving such information, the system may evaluate a user's propensity or likelihood to utilize the system with given access configurations (e.g., parameters for accessing the resource), thereby enabling the system to improve user engagement.

In some embodiments, the system may obtain the first resource access history based on extracting resource access events from a database. For example, the system may compare the first user identifier with a plurality of user identifiers in a user database. The user database may include a list of user identifiers and corresponding resource access histories. Based on determining that the first user identifier matches a corresponding user identifier of the plurality of user identifiers, the system may extract a plurality of resource access events and a corresponding plurality of timestamps. The system may store the plurality of resource access events as the first resource access history for the first user. As an illustrative example, the system may retrieve information relating to other lines of credit or products purchased by a user based on the user's name, account number, or social security number, including configurations or parameters for accessing such resources (e.g., interest rates or whether the access was associated with a buy-now-pay-later program). For example, the system may obtain a credit report for the user, where the credit report indicates a list of previous loans, lines of credit, or credit checks associated with the user, along with associated values (e.g., monetary values) or timestamps. By retrieving such information about the user, the system may consider and evaluate behavior that the user is likely to engage in and suggest access configurations for accessing the requested resource according to a framework most likely to engage the user.

At step 406, process 400 (e.g., using one or more of the components described above) enables the system to generate access configurations that are available to the first user. For example, based on the first requested resource, the system may generate a first plurality of access configurations for the first requested resource available to the first user for obtaining access to the first requested resource. As an illustrative example, the system may determine, such as through a database of access configurations, a list of possible payment plans or financing frameworks that a user may utilize to make a requested purchase or transaction request. For example, the system may determine a list of financing options for a given requested transaction based on the value of the requested transaction (e.g., a price of the requested product), as some lines of credit or payment plans may only be available for purchases of certain values. For example, the system may determine a list of financing options (including buy-now-pay-later loans) for a requested loan for a customer's purchase, where each financing option includes a payment schedule length (e.g., length of time), an interest rate/annual percentage rate, and/or other details regarding the financing option. As such, the system may generate a list of access configurations that are compatible with the requested resource, thereby enabling the user to choose a way to access the requested resource in a flexible manner.

In some embodiments, the system may determine access configurations available for accessing requested resources based on resource parameters associated with the resource access request. For example, the system may determine, based on the first requested resource, a first resource parameter for the first requested resource, where the first resource parameter characterizes the first requested resource. The system may obtain, from an access configuration database, a plurality of available access configurations and a corresponding plurality of access configuration thresholds. Each available access configuration of the plurality of available access configurations may indicate configurations for user access to resources, and each access configuration threshold of the corresponding plurality of access configuration thresholds may indicate an associated condition for allowing access to resources based on resource parameters. Based on comparing the first resource parameter with each access configuration threshold of the corresponding plurality of access configuration thresholds, the system may determine the first plurality of access configurations for the first requested resource available to the first user, wherein the first plurality of access configurations is a subset of the plurality of available access configurations. As an illustrative example, the system may determine a resource parameter, such as a price or value of a requested line of credit associated with purchasing a product. The system may determine access configurations with access configuration thresholds that are compatible with this price or value; for example, a buy-now-pay-later plan for completing the transaction may only be available for transactions of below a predetermined price (e.g., an access configuration threshold). Additionally or alternatively, a buy-now-pay-later plan may only be available for a customer's transaction that is associated with a particular merchant or transaction type (e.g., a type of purchased items). By comparing access configuration thresholds corresponding to various access configurations with parameters associated with the requested resource, the system may ensure compatibility between suggested options for accessing resources and the resource requested by the user.

In some embodiments, the system may determine access configurations that may be available to the user based on the user's potential risk to the system. For example, based on the first resource access history, the system may determine a measure of risk associated with allocating resources to the first user. The system may obtain, from an access configuration database, a plurality of available access configurations and a corresponding plurality of risk thresholds. Each risk threshold of the corresponding plurality of risk thresholds may indicate an associated condition for allowing access to resources based on measures of risk associated with users. Based on comparing the measure of risk with each risk threshold of the corresponding plurality of risk thresholds, the system may determine the first plurality of access configurations for the first requested resource available to the first user, where the first plurality of access configurations is a subset of the plurality of available access configurations. For example, the system may utilize the resource access history corresponding to the requesting user in order to determine the reputability of the user with respect to the system. As an illustrative example, the system may determine the likelihood that the given user may fail to make payments on a payment plan for accessing a line of credit. By evaluating such a measure of risk associated with allowing access to resources based on measures of risk associated with the user, the system may ensure that resources are provided to requesting users in a manner that is less likely to harm the system or cause losses, such as due to a user's lack of demonstrated financial responsibility. As such, the system may mitigate possible issues or risks associated with providing resources to users based on information relating to a user's past behavior.

At step 408, process 400 (e.g., using one or more components described above) enables the system to generate a plurality of probabilities using a machine learning model. For example, the system may process the first resource access history and the first plurality of access configurations using a first machine learning model to generate a first plurality of probabilities, where each probability of the first plurality of probabilities indicates a likelihood of the first user accessing the first requested resource using a corresponding access configuration of the first plurality of access configurations. Thus, based on evaluating user behavior associated with the first resource access history, the system may determine whether a given access configuration that is available to the user may be likely to be selected by the user based on the user's engagement with previous system resources. As an illustrative example, the system may determine that a user is likely to engage with a merchant if there are buy-now-pay-later options for making transactions. As such, the system may determine that there is a relatively high probability of a user selecting an access configuration associated with a buy-now-pay-later model. As such, the system may suggest ways of accessing the user's requested resource based on the likelihood that the user may engage with the given access configuration, thereby improving the system utilization based on leveraging users' past behaviors.

In some embodiments, the system may train the machine learning model to output probabilities based on information within the corresponding resource access history. For example, the system may receive a plurality of resource access histories associated with a corresponding plurality of users. Each resource access history of the plurality of resource access histories may indicate a plurality of resources accessed by an associated user of the corresponding plurality of users. The system may receive a plurality of sets of access configurations associated with the corresponding plurality of users, where each set of access configurations indicates one or more access configurations utilized by the associated user to access resources. Based on providing the plurality of resource access histories and the plurality of sets of access configurations to the first machine learning model, the system may train the first machine learning model to output probabilities corresponding to likelihoods that users will access requested resources using access configurations. For example, the system may leverage user behavior relating to access of access configurations to train the model to determine the likelihood that a given user, with a given resource access history, may access a given resource with a given access configuration. As an illustrative example, the system may retrieve a plurality of access configurations that have been accessed by other users, where the access configurations may indicate ways to purchase a product or execute a transaction with given financial instruments (e.g., with cash, debit cards, credit, and/or buy-now-pay-later plans). By determining how resource access histories may indicate a user's propensity to access certain payment plans, the system may train the machine learning model to output likelihoods that a user may access a given resource using a given access configuration, thereby improving the system's ability to improve user engagement with the system.

At step 410, process 400 (e.g., using one or more components discussed above) enables the system to determine a subset of access configurations based on comparing probabilities with a threshold probability. For example, the system may determine a subset of access configurations based on comparing each probability of the first plurality of probabilities with a threshold probability. As an illustrative example, the system may compare probabilities that indicate a likelihood that a user may access the requested resources using a given access configuration. The system may determine access configurations that are most likely to lead to user engagement, such as through comparing each generated access probability with a threshold probability. By doing so, the system may provide users with access configurations (e.g., options for accessing the requested resource) that are desirable, thereby improving user engagement.

In some embodiments, the system may determine a subset of probabilities based on determining that each probability is greater than the threshold probability. For example, the system may determine that each probability of the subset of probabilities of the first plurality of probabilities is greater than the threshold probability. The system may generate the first subset of access configurations based on the subset of probabilities, where each probability of the subset of probabilities is associated with the corresponding access configuration of the first plurality of access configurations. As an illustrative example, the system may only present payment plans for a user making a purchase with a merchant that are most likely to result in a purchase by the user. By choosing only those access configurations that have a high enough probability of user engagement, the system may present to the user desirable options for accessing the requested resource, thereby mitigating the risk that the user may not engage with the system (e.g., make a transaction), which may decrease system utilization or merchant margins.

In some embodiments, the system may determine the threshold probability based on information relating to the requested resource. For example, the system may determine, based on the requested resource, a resource parameter for the first requested resource, where the resource parameter characterizes the first requested resource. Based on the resource parameter for the first requested resource, the system may determine a threshold probability. As an illustrative example, for a user requesting a large purchase (e.g., with a large value of the resource requested), the system may determine a lower threshold probability for user engagement in order to encourage the user to access the resource even if potentially undesirable to the user. Alternatively or additionally, the system may determine the threshold probability based on one or more access benefit metrics calculated for given access configurations. By doing so, the system may improve user engagement with the system (e.g., may encourage a purchase) in situations where a user purchase may have a large system benefit or based on the nature of the requested resources.

At step 412, process 400 (e.g., using one or more components described above) enables the system to generate an access benefit metric for each access configuration. For example, the system may generate an access benefit metric for each access configuration of the first subset of access configurations, wherein each access benefit metric indicates a measure of resource savings when the first user accesses the first requested resource through an associated access configuration. As an illustrative example, the system may determine a financial benefit for a merchant or for the system relating to a user's access of the requested resource using a given access configuration. As such, the system may evaluate the system benefit associated with providing a resource to the user in order to further determine how to display such resources to the user in a manner that may improve the system's efficiency or security, or mitigate the system's risk.

In some embodiments, the system may generate the access benefit metric based on determining a parameter set for each access configuration that is available to the user or likely to lead to user engagement. For example, the system may obtain a parameter set corresponding to the associated access configuration, wherein each parameter of the parameter set characterizes access to the first requested resource using the associated access configuration. The system may determine, based on the parameter set, an expected risk metric and an expected gain metric for providing access to the first requested resource for the first user through the associated access configuration. Based on the expected risk metric and the expected gain metric, the system may generate a first access benefit metric associated with a corresponding access benefit metric of the first subset of access configurations. For example, the system may use information relating to access configurations' possible gain or loss (e.g., parameters associated with each access configuration) to determine a metric relating to whether, based on a given payment plan for a particular product, the system may likely make a gain or a loss. As an illustrative example, the system may compare interest rates associated with various payment plans (e.g., cash, debit, credit, and/or buy-now-pay-later) in order to predict or evaluate possible outcomes in providing a user with a requested resource (e.g., with a transaction request to make a purchase from a merchant). As such, the system may consider possible system benefit or risk to improve or encourage user engagement with more efficient, secure, or beneficial ways to access resources.

In some embodiments, the system may update the expected risk metric, the expected gain metric, and the resulting access benefit metric based on the measure of risk associated with the user. For example, based on the first resource access history, the system may determine a measure of risk associated with allocating resources to the first user. Based on the measure of risk, the system may modify parameters of the parameter set corresponding to the associated access configuration. Based on the parameter set, the system may generate an updated expected risk metric and an updated expected gain metric for providing access to the first requested resource for the first user through the associated access configuration. Based on the updated expected risk metric and the updated expected gain metric, the system may update the access benefit metric. For example, the system may determine that, based on a user's resource access history, a given user may not reliably make any required payments associated with a payment plan on time. As such, the system may determine or modify risk or gain metrics associated with the payment plan (e.g., the access configuration) based on the user's measure of risk. By doing so, the system may personalize predictions of the outcome of a user's access to a requested resource using a given access configuration, improving the quality or accuracy of such predictions.

In some embodiments, the system may determine the first access benefit metric by inputting a parameter set into a machine learning model. For example, the system may obtain a parameter set corresponding to the associated access configuration, wherein each parameter of the parameter set characterizes one or more rules for accessing the first requested resource using the associated access configuration. Based on inputting the first resource access history and the parameter set to a second machine learning model, the system may generate a first access benefit metric associated with a corresponding access benefit metric of the first subset of access configurations. As an illustrative example, the system may determine, based on the nature of a given access configuration (e.g., based on parameters associated with the access configuration, such as an interest rate associated with a payment plan) and also based on a user's previous behavior, a measure of a predicted benefit (e.g., merchant margin) associated with providing the user with the requested resource with the given access configuration. By doing so, the system may improve the quality of the personalization of predictions of system outcomes, thereby improving the benefits conferred to the system upon user engagement with an access configuration.

In some embodiments, the system may train the second machine learning model based on previous outcomes associated with users accessing resources using corresponding access configurations. For example, the system may receive a plurality of sets of access configurations associated with a corresponding plurality of users, wherein each set of access configurations indicates one or more access configurations utilized by an associated user of the corresponding plurality of users to access resources. The system may receive a plurality of resource access outcomes associated with the corresponding plurality of users, wherein each resource access outcome indicates benefit due to access of resources by users. Based on providing the plurality of sets of access configurations and the plurality of resource access outcomes to the second machine learning model, the system may train the second machine learning model to output access benefit metrics based on access configurations and related outcomes. For example, the system may utilize payment or transaction histories associated with users of the system, as well as outcomes relating to their use of system resources through given access configurations, in order to train a machine learning model to output predictions. As such, the system may leverage previous user data in order to improve predictions of user behavior and resulting system effects or outcomes.

In some embodiments, the system may update access benefit metrics dynamically based on the user's selection of an access configuration and subsequent interaction with the system. For example, the system may receive a resource access outcome for the first user, wherein the resource access outcome indicates system benefit due to access of the first requested resource by the first user using a chosen access configuration of the first subset of access configurations. Based on providing the resource access outcome and the chosen access configuration to the second machine learning model, the system may update the second machine learning model to output updated access benefit metrics based on access configurations and related outcomes. For example, the system may learn from a user's behavior following selection of an access configuration (e.g., following the user's access to the requested resource) in order to refine access benefit metrics associated with the chosen access configuration. As an illustrative example, the system may determine the access benefit metrics based on a user's ability to make payments on a given buy-now-pay-later plan. As such, the system may improve estimates or evaluation of a given access configuration based on dynamically tracking a user's behavior.

At step 414, process 400 (e.g., using one or more components described above) enables the system to generate a representation of access configurations according to the access benefit metrics. For example, the system may generate, for display on a user interface associated with the user terminal, a representation of the first subset of access configurations displayed according to access benefit metrics corresponding to the first subset of access configurations. As an illustrative example, the system may generate a representation of different payment methods accessible to a user for executing a transaction with a merchant. The system may generate this representation on the basis of the access benefit metric, such as by displaying access configurations/payment methods in a manner that encourages the user to choose access configurations with a higher merchant margin or profit. As such, the system may encourage more beneficial outcomes by encouraging user behavior to this end.

In some embodiments, the system may generate the representation as an ordered list of access configurations. For example, based on the first subset of access configurations, the system may determine an ordered list of access configurations, wherein each access configuration of the ordered list of access configurations is included in the first subset of access configurations and is listed in order of decreasing access benefit metric. The system may generate the ordered list of access configurations for display to enable user selection of a chosen access configuration of the ordered list of access configurations. For example, the system may enable a display of payment options for a given transaction with a merchant that is requested by a user such that options more profitable to a merchant are listed at the top of a given user interface, with less profitable options listed below. As such, the system may encourage a user to select more beneficial access configurations for accessing a given resource, thereby improving system benefit.

In some embodiments, the system may receive a user response and provide the resource according to the user's selection. For example, the system may receive, from a first user via a user terminal, a user response comprising a chosen access configuration. The system may provide access to the first requested resource for the first user according to parameters associated with the chosen access configuration. For example, the user may select a given access configuration by interacting with a mechanism on a user display (e.g., by clicking a button associated with a particular payment method). Thus, the system may provide the resource to the user (e.g., may execute the transaction for the required product) according to the chosen access configuration or payment method. Thus, the system may act according to user choice, thereby improving the flexibility and control a user has over system use and access to a given resource.

In some embodiments, the system may update probabilities associated with a user selecting a given access configuration based on the user's choice. For example, the system may update the first resource access history to include the first requested resource. The system may provide the first resource access history and the chosen access configuration to update the first machine learning model to generate pluralities of probabilities of users accessing requested resources using given access configurations. As an illustrative example, the system may determine that the user is more likely to select an access configuration (e.g., payment method) that is similar to the chosen access configuration in the future, thereby improving the predictive ability of the system to determine user behavior and improve user engagement with the system in the future.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, from a user via a user terminal, a resource access request comprising a user identifier and a resource identifier for a requested resource; based on the user identifier, obtaining a resource access history for the user, wherein the resource access history comprises a plurality of resource access requests from the user; based on the resource identifier for the requested resource, generating a plurality of access configurations available to the user for obtaining access to the requested resource; processing the resource access history and the plurality of access configurations using a machine learning model to generate a plurality of probabilities, wherein each probability of the plurality of probabilities indicates a likelihood of the user accessing the requested resource using a corresponding access configuration of the plurality of access configurations; based on comparing each probability of the plurality of probabilities with a threshold probability, determining a subset of access configurations having a corresponding probability that is greater than the threshold probability; based on a plurality of parameters corresponding to each access configuration of the subset of access configurations, generating an access benefit metric for each access configuration of the subset of access configurations, wherein each access benefit metric indicates a measure of resource savings for the system when the user accesses the requested resource through an associated access configuration; and generating, for display on a user interface associated with the user terminal, a ranked representation of the subset of access configurations displayed in order of decreasing access benefit metric for the associated access configuration.

2. A method, the method comprising: receiving, from a first user via a user terminal, a resource access request comprising a first user identifier and a first requested resource; based on the first user identifier, obtaining a first resource access history for the first user, wherein the first resource access history indicates information comprising resources previously accessed by the first user; based on the first requested resource, generating a first plurality of access configurations for the first requested resource available to the first user for obtaining access to the first requested resource; processing the first resource access history and the first plurality of access configurations using a first machine learning model to generate a first plurality of probabilities, wherein each probability of the first plurality of probabilities indicates a likelihood of the first user accessing the first requested resource using a corresponding access configuration of the first plurality of access configurations; based on comparing each probability of the first plurality of probabilities with a threshold probability, determining a first subset of access configurations; generating an access benefit metric for each access configuration of the first subset of access configurations, wherein each access benefit metric indicates a measure of resource savings when the first user accesses the first requested resource through an associated access configuration; and generating, for display on a user interface associated with the user terminal, a representation of the first subset of access configurations displayed according to access benefit metrics corresponding to the first subset of access configurations.

3. A method, the method comprising: receiving, from a first user via a user terminal, a resource access request comprising a first user identifier and a first requested resource; based on the first user identifier, obtaining a first resource access history for the first user, wherein the first resource access history indicates information comprising resources previously accessed by the first user; based on the first requested resource, generating a first plurality of access configurations for the first requested resource available to the first user for obtaining access to the first requested resource; processing the first resource access history and the first plurality of access configurations using a first machine learning model to generate a first plurality of probabilities, wherein each probability of the first plurality of probabilities indicates a likelihood of the first user accessing the first requested resource using a corresponding access configuration of the first plurality of access configurations; based on comparing each probability of the first plurality of probabilities with a threshold probability, determining a first subset of access configurations; generating an access benefit metric for each access configuration of the first subset of access configurations, wherein each access benefit metric indicates a measure of resource savings when the first user accesses the first requested resource through an associated access configuration; and generating, for display on a user interface associated with the user terminal, a representation of the first subset of access configurations displayed in order of decreasing access benefit metrics, wherein the decreasing access benefit metrics correspond to the first subset of access configurations.

4. The method of any of the preceding embodiments, wherein obtaining the first resource access history for the first user comprises: comparing the first user identifier with a plurality of user identifiers in a user database, wherein the user database comprises a list of user identifiers and corresponding resource access histories; based on determining that the first user identifier matches a corresponding user identifier of the plurality of user identifiers, extracting a plurality of resource access events and a corresponding plurality of timestamps; and storing the plurality of resource access events as the first resource access history for the first user.

5. The method of any of the preceding embodiments, wherein generating the first plurality of access configurations for the first requested resource available to the first user comprises: determining, based on the first requested resource, a first resource parameter for the first requested resource, wherein the first resource parameter characterizes the first requested resource; obtaining, from an access configuration database, a plurality of available access configurations and a corresponding plurality of access configuration thresholds, wherein each available access configuration of the plurality of available access configurations indicates configurations for user access to resources, and wherein each access configuration threshold of the corresponding plurality of access configuration thresholds indicates an associated condition for allowing access to resources based on resource parameters; and based on comparing the first resource parameter with each access configuration threshold of the corresponding plurality of access configuration thresholds, determining the first plurality of access configurations for the first requested resource available to the first user, wherein the first plurality of access configurations is a subset of the plurality of available access configurations.

6. The method of any of the preceding embodiments, wherein generating the first plurality of access configurations for the first requested resource available to the first user comprises: based on the first resource access history, determining a measure of risk associated with allocating resources to the first user; obtaining, from an access configuration database, a plurality of available access configurations and a corresponding plurality of risk thresholds, wherein each risk threshold of the corresponding plurality of risk thresholds indicates an associated condition for allowing access to resources based on measures of risk associated with users; and based on comparing the measure of risk with each risk threshold of the corresponding plurality of risk thresholds, determining the first plurality of access configurations for the first requested resource available to the first user, wherein the first plurality of access configurations is a subset of the plurality of available access configurations.

7. The method of any of the preceding embodiments, further comprising: receiving a plurality of resource access histories associated with a corresponding plurality of users, wherein each resource access history of the plurality of resource access histories indicates a plurality of resources accessed by an associated user of the corresponding plurality of users; receiving a plurality of sets of access configurations associated with the corresponding plurality of users, wherein each set of access configurations indicates one or more access configurations utilized by the associated user to access resources; and based on providing the plurality of resource access histories and the plurality of sets of access configurations to the first machine learning model, training the first machine learning model to output probabilities corresponding to likelihoods that users will access requested resources using access configurations.

8. The method of any of the preceding embodiments, wherein generating the access benefit metric for each access configuration of the first subset of access configurations comprises: obtaining a parameter set corresponding to the associated access configuration, wherein each parameter of the parameter set characterizes access to the first requested resource using the associated access configuration; determining, based on the parameter set, an expected risk metric and an expected gain metric for providing access to the first requested resource for the first user through the associated access configuration; and based on the expected risk metric and the expected gain metric, generating a first access benefit metric associated with a corresponding access benefit metric of the first subset of access configurations.

9. The method of any of the preceding embodiments, further comprising: based on the first resource access history, determining a measure of risk associated with allocating resources to the first user; based on the measure of risk, modifying parameters of the parameter set corresponding to the associated access configuration; based on the parameter set, generating an updated expected risk metric and an updated expected gain metric for providing access to the first requested resource for the first user through the associated access configuration; and based on the updated expected risk metric and the updated expected gain metric, updating the access benefit metric.

10. The method of any of the preceding embodiments, wherein generating the access benefit metric for each access configuration of the first subset of access configurations comprises: obtaining a parameter set corresponding to the associated access configuration, wherein each parameter of the parameter set characterizes one or more rules for accessing the first requested resource using the associated access configuration; and based on inputting the first resource access history and the parameter set to a second machine learning model, generating a first access benefit metric associated with a corresponding access benefit metric of the first subset of access configurations.

11. The method of any of the preceding embodiments, further comprising: receiving a plurality of sets of access configurations associated with a corresponding plurality of users, wherein each set of access configurations indicates one or more access configurations utilized by an associated user of the corresponding plurality of users to access resources; receiving a plurality of resource access outcomes associated with the corresponding plurality of users, wherein each resource access outcome indicates benefit due to access of resources by users; and based on providing the plurality of sets of access configurations and the plurality of resource access outcomes to the second machine learning model, training the second machine learning model to output access benefit metrics based on access configurations and related outcomes.

12. The method of any of the preceding embodiments, further comprising: receiving a resource access outcome for the first user, wherein the resource access outcome indicates system benefit due to access of the first requested resource by the first user using a chosen access configuration of the first subset of access configurations; and based on providing the resource access outcome and the chosen access configuration to the second machine learning model, updating the second machine learning model to output updated access benefit metrics based on access configurations and related outcomes.

13. The method of any of the preceding embodiments, wherein determining the first subset of access configurations comprises: determining that each probability of a subset of probabilities of the first plurality of probabilities is greater than the threshold probability; and generating the first subset of access configurations based on the subset of probabilities, wherein each probability of the subset of probabilities is associated with the corresponding access configuration of the first plurality of access configurations.

14. The method of any of the preceding embodiments, wherein generating the representation of the first subset of access configurations displayed according to access benefit metrics corresponding to the first subset of access configurations comprises: based on the first subset of access configurations, determining an ordered list of access configurations, wherein each access configuration of the ordered list of access configurations is included in the first subset of access configurations and is listed in order of decreasing access benefit metric; and generating the ordered list of access configurations for display to enable user selection of a chosen access configuration of the ordered list of access configurations.

15. The method of any of the preceding embodiments, further comprising: receiving, via the user terminal from the first user, a user response comprising a chosen access configuration; and providing access to the first requested resource for the first user according to parameters associated with the chosen access configuration.

16. The method of any of the preceding embodiments, further comprising: updating the first resource access history to include the first requested resource; and providing the first resource access history and the chosen access configuration to update the first machine learning model to generate pluralities of probabilities of users accessing requested resources using given access configurations.

17. The method of any of the preceding embodiments, further comprising: determining, based on the first requested resource, a resource parameter for the first requested resource, wherein the resource parameter characterizes the first requested resource; and based on the resource parameter for the first requested resource, determining the threshold probability.

18. A non-transitory, computer-readable medium storing instructions that, when executed by a data processing apparatus, cause the data processing apparatus to perform operations comprising those of any of embodiments 1-17.

19. A system comprising one or more processors; and memory storing instructions that, when executed by the one or more processors, cause the processors to effectuate operations comprising those of any of embodiments 1-17.

20. A system comprising means for performing any of embodiments 1-17.

21. A system comprising cloud-based circuitry for performing any of embodiments 1-17.

What is claimed is:

1. A system for ranking access configurations for requested resources, the system comprising:
   one or more processors; and
   one or more non-transitory, computer-readable media storing instructions that, when executed by the one or more processors, cause operations comprising:
      receiving, from a user via a user terminal, a resource access request comprising a user identifier and a resource identifier for a requested resource, wherein the requested resource is a processing resource of a computing system;
      based on the user identifier, obtaining a resource access history for the user, the resource access history comprising a plurality of previous resource access requests from the user, by:
         comparing the user identifier with a plurality of user identifiers in a user database, wherein the user database comprises a list of user identifiers and corresponding resource access histories;
         based on determining that the user identifier matches a corresponding user identifier of the plurality of user identifiers, extracting a plurality of resource access events and a corresponding plurality of timestamps; and
         storing the plurality of resource access events as the resource access history for the user;
      based on the resource access history, determining a measure of risk associated with allocating resources to the user, wherein the measure of risk indicates a computational cost associated with providing the requested resource;
      based on the resource identifier for the requested resource and the measure of risk, generating a plurality of access configurations available to the user for obtaining access to the requested resource, wherein the plurality of access configurations indicate options for accessing the requested resource;
      processing the resource access history and the plurality of access configurations using a machine learning model to generate a plurality of probabilities, wherein each probability of the plurality of probabilities indicates a likelihood of the user accessing the requested resource using a corresponding access configuration of the plurality of access configurations;
      based on comparing each probability of the plurality of probabilities with a threshold probability, determining a subset of access configurations having a corresponding probability that is greater than the threshold probability;
      based on a plurality of parameters corresponding to each access configuration of the subset of access configurations, generating an access benefit metric for each access configuration of the subset of access configurations, wherein each access benefit metric indicates a measure of resource savings for the system when the user accesses the requested resource through an associated access configuration;

generating, for display on a user interface associated with the user terminal, a ranked representation of the subset of access configurations displayed in order of decreasing access benefit metric for the associated access configuration;

receiving, via the user terminal from the user, a user response comprising a chosen access configuration from the subset of access configurations; and providing access to the requested resource for the user according to parameters associated with the chosen access configuration.

2. A method comprising:

receiving, from a first user via a user terminal, a resource access request comprising a first user identifier and a first requested resource, wherein the first requested resource is a processing resource of a computing system;

based on the first user identifier, obtaining a first resource access history for the first user, the first resource access history indicating information comprising resources previously accessed by the first user, by:
   comparing the first user identifier with a plurality of user identifiers in a user database, wherein the user database comprises a list of user identifiers and corresponding resource access histories:
   based on determining that the first user identifier matches a corresponding user identifier of the plurality of user identifiers, extracting a plurality of resource access events and a corresponding plurality of timestamps; and
   storing the plurality of resource access events as the first resource access history for the first user;

based on the first resource access history, determining a measure of risk associated with allocating resources to the first user, wherein the measure of risk indicates a computational cost associated with providing the first requested resource;

based on the first requested resource and the measure of risk, generating a first plurality of access configurations for the first requested resource available to the first user for obtaining access to the first requested resource, wherein the first plurality of access configurations indicate options for accessing the first requested resource;

processing the first resource access history and the first plurality of access configurations using a first machine learning model to generate a first plurality of probabilities, wherein each probability of the first plurality of probabilities indicates a likelihood of the first user accessing the first requested resource using a corresponding access configuration of the first plurality of access configurations;

based on comparing each probability of the first plurality of probabilities with a threshold probability, determining a first subset of access configurations;

generating an access benefit metric for each access configuration of the first subset of access configurations, wherein each access benefit metric indicates a measure of resource savings when the first user accesses the first requested resource through an associated access configuration;

generating, for display on a user interface associated with the user terminal, a representation of the first subset of access configurations displayed according to access benefit metrics corresponding to the first subset of access configurations;

receiving, via the user terminal from the first user, a user response comprising a chosen access configuration from the first subset of access configurations; and providing access to the first requested resource for the first user according to parameters associated with the chosen access configuration.

3. The method of claim 2, wherein generating the first plurality of access configurations for the first requested resource available to the first user comprises:

determining, based on the first requested resource, a first resource parameter for the first requested resource, wherein the first resource parameter characterizes the first requested resource;

obtaining, from an access configuration database, a plurality of available access configurations and a corresponding plurality of access configuration thresholds, wherein each available access configuration of the plurality of available access configurations indicates configurations for user access to resources, and wherein each access configuration threshold of the corresponding plurality of access configuration thresholds indicates an associated condition for allowing access to resources based on resource parameters; and based on comparing the first resource parameter with each access configuration threshold of the corresponding plurality of access configuration thresholds, determining the first plurality of access configurations for the first requested resource available to the first user, wherein the first plurality of access configurations is a subset of the plurality of available access configurations.

4. The method of claim 2, wherein generating the first plurality of access configurations for the first requested resource available to the first user comprises:

obtaining, from an access configuration database, a plurality of available access configurations and a corresponding plurality of risk thresholds, wherein each risk threshold of the corresponding plurality of risk thresholds indicates an associated condition for allowing access to resources based on measures of risk associated with users; and based on comparing the measure of risk with each risk threshold of the corresponding plurality of risk thresholds, determining the first plurality of access configurations for the first requested resource available to the first user, wherein the first plurality of access configurations is a subset of the plurality of available access configurations.

5. The method of claim 2, further comprising:

receiving a plurality of resource access histories associated with a corresponding plurality of users, wherein each resource access history of the plurality of resource access histories indicates a plurality of resources accessed by an associated user of the corresponding plurality of users;

receiving a plurality of sets of access configurations associated with the corresponding plurality of users, wherein each set of access configurations indicates one or more access configurations utilized by the associated user to access resources; and based on providing the plurality of resource access histories and the plurality of sets of access configurations to the first machine learning model, training the first machine learning model to output probabilities corresponding to likelihoods that users will access requested resources using access configurations.

6. The method of claim 2, wherein generating the access benefit metric for each access configuration of the first subset of access configurations comprises:
  obtaining a parameter set corresponding to the associated access configuration, wherein each parameter of the parameter set characterizes access to the first requested resource using the associated access configuration;
  determining, based on the parameter set, an expected risk metric and an expected gain metric for providing access to the first requested resource for the first user through the associated access configuration; and
  based on the expected risk metric and the expected gain metric, generating a first access benefit metric associated with a corresponding access benefit metric of the first subset of access configurations.

7. The method of claim 6, further comprising:
  based on the measure of risk, modifying parameters of the parameter set corresponding to the associated access configuration;
  based on the parameter set, generating an updated expected risk metric and an updated expected gain metric for providing access to the first requested resource for the first user through the associated access configuration; and
  based on the updated expected risk metric and the updated expected gain metric, updating the access benefit metric.

8. The method of claim 2, wherein generating the access benefit metric for each access configuration of the first subset of access configurations comprises:
  obtaining a parameter set corresponding to the associated access configuration, wherein each parameter of the parameter set characterizes one or more rules for accessing the first requested resource using the associated access configuration; and
  based on inputting the first resource access history and the parameter set to a second machine learning model, generating a first access benefit metric associated with a corresponding access benefit metric of the first subset of access configurations.

9. The method of claim 8, further comprising:
  receiving a plurality of sets of access configurations associated with a corresponding plurality of users, wherein each set of access configurations indicates one or more access configurations utilized by an associated user of the corresponding plurality of users to access resources;
  receiving a plurality of resource access outcomes associated with the corresponding plurality of users, wherein each resource access outcome indicates benefit due to access of resources by users; and
  based on providing the plurality of sets of access configurations and the plurality of resource access outcomes to the second machine learning model, training the second machine learning model to output access benefit metrics based on access configurations and related outcomes.

10. The method of claim 8, further comprising:
  receiving a resource access outcome for the first user, wherein the resource access outcome indicates system benefit due to access of the first requested resource by the first user using a chosen access configuration of the first subset of access configurations; and
  based on providing the resource access outcome and the chosen access configuration to the second machine learning model, updating the second machine learning model to output updated access benefit metrics based on access configurations and related outcomes.

11. The method of claim 2, wherein determining the first subset of access configurations comprises:
  determining that each probability of a subset of probabilities of the first plurality of probabilities is greater than the threshold probability; and
  generating the first subset of access configurations based on the subset of probabilities, wherein each probability of the subset of probabilities is associated with the corresponding access configuration of the first plurality of access configurations.

12. The method of claim 2, wherein generating the representation of the first subset of access configurations displayed according to access benefit metrics corresponding to the first subset of access configurations comprises:
  based on the first subset of access configurations, determining an ordered list of access configurations, wherein each access configuration of the ordered list of access configurations is included in the first subset of access configurations and is listed in order of decreasing access benefit metric; and
  generating the ordered list of access configurations for display to enable user selection of a chosen access configuration of the ordered list of access configurations.

13. The method of claim 2, further comprising:
  receiving, via the user terminal from the first user, a user response comprising a chosen access configuration; and
  providing access to the first requested resource for the first user according to parameters associated with the chosen access configuration.

14. The method of claim 13, further comprising:
  updating the first resource access history to include the first requested resource; and
  providing the first resource access history and the chosen access configuration to update the first machine learning model to generate pluralities of probabilities of users accessing requested resources using given access configurations.

15. The method of claim 2, further comprising:
  determining, based on the first requested resource, a resource parameter for the first requested resource, wherein the resource parameter characterizes the first requested resource; and
  based on the resource parameter for the first requested resource, determining the threshold probability.

16. A non-transitory, computer-readable medium comprising instructions that, when executed by one or more processors, cause operations comprising:
  receiving, from a first user via a user terminal, a resource access request comprising a first user identifier and a first requested resource;
  based on the first user identifier, obtaining a first resource access history for the first user, the first resource access history indicating information comprising resources previously accessed by the first user, by:
    comparing the first user identifier with a plurality of user identifiers in a user database, wherein the user database comprises a list of user identifiers and corresponding resource access histories;
    based on determining that the first user identifier matches a corresponding user identifier of the plurality of user identifiers, extracting a plurality of resource access events and a corresponding plurality of timestamps; and storing the plurality of resource access events as the first resource access history for the first user;

based on the first resource access history, determining a measure of risk associated with allocating resources to the first user, wherein the measure of risk indicates a computational cost associated with providing the first requested resource;

based on the first requested resource and the measure of risk, generating a first plurality of access configurations for the first requested resource available to the first user for obtaining access to the first requested resource;

processing the first resource access history and the first plurality of access configurations using a first machine learning model to generate a first plurality of probabilities, wherein each probability of the first plurality of probabilities indicates a likelihood of the first user accessing the first requested resource using a corresponding access configuration of the first plurality of access configurations;

based on comparing each probability of the first plurality of probabilities with a threshold probability, determining a first subset of access configurations;

generating an access benefit metric for each access configuration of the first subset of access configurations, wherein each access benefit metric indicates a measure of resource savings when the first user accesses the first requested resource through an associated access configuration;

generating, for display on a user interface associated with the user terminal, a representation of the first subset of access configurations displayed in order of decreasing access benefit metrics, wherein the decreasing access benefit metrics correspond to the first subset of access configurations;

receiving, via the user terminal from the first user, a user response comprising a chosen access configuration from the first subset of access configurations; and providing access to the first requested resource for the first user according to parameters associated with the chosen access configuration.

17. The non-transitory, computer-readable medium of claim 16, wherein the instructions for obtaining the first resource access history for the first user cause operations further comprising:

comparing the first user identifier with a plurality of user identifiers in a user database, wherein the user database comprises a list of user identifiers and corresponding resource access histories;

based on determining that the first user identifier matches a corresponding user identifier of the plurality of user identifiers, extracting a plurality of resource access events and a corresponding plurality of timestamps; and storing the plurality of resource access events as the first resource access history for the first user.

18. The non-transitory, computer-readable medium of claim 16, wherein the instructions for generating the first plurality of access configurations for the first requested resource available to the first user cause operations comprising:

determining, based on the first requested resource, a first resource parameter for the first requested resource, wherein the first resource parameter characterizes the first requested resource;

obtaining, from an access configuration database, a plurality of available access configurations and a corresponding plurality of access configuration thresholds, wherein each available access configuration of the plurality of available access configurations indicates configurations for user access to resources, and wherein each access configuration threshold of the corresponding plurality of access configuration thresholds indicates an associated condition for allowing access to resources based on resource parameters; and based on comparing the first resource parameter with each access configuration threshold of the corresponding plurality of access configuration thresholds, determining the first plurality of access configurations for the first requested resource available to the first user, wherein the first plurality of access configurations is a subset of the plurality of available access configurations.

19. The non-transitory, computer-readable medium of claim 16, wherein the instructions for generating the first plurality of access configurations for the first requested resource available to the first user cause operations further comprising:

obtaining, from an access configuration database, a plurality of available access configurations and a corresponding plurality of risk thresholds, wherein each risk threshold of the corresponding plurality of risk thresholds indicates an associated condition for allowing access to resources based on measures of risk associated with users; and based on comparing the measure of risk with each risk threshold of the corresponding plurality of risk thresholds, determining the first plurality of access configurations for the first requested resource available to the first user, wherein the first plurality of access configurations is a subset of the plurality of available access configurations.

* * * * *